United States Patent
Verouden et al.

(10) Patent No.: US 10,842,158 B2
(45) Date of Patent: Nov. 24, 2020

(54) METHOD FOR CLEANING AND/ OR EVALUATING A FOOD PRODUCTS MOULD DRUM AND A COMBINATION OF SUCH A FOOD PRODUCTS MOULD DRUM AND A MOULD DRUM CLEANING AND/ OR EVALUATING DEVICE

(71) Applicant: MAREL TOWNSEND FURTHER PROCESSING B.V., Boxmeer (NL)

(72) Inventors: Franciscus Quirinus Fredrik Verouden, Sint Anthonis (NL); Johannes Martinus Meulendijks, Deurne (NL); Gerardus Theodorus Andreas Bisseling, Escharen (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 171 days.

(21) Appl. No.: 16/083,748

(22) PCT Filed: Mar. 7, 2017

(86) PCT No.: PCT/NL2017/050135
§ 371 (c)(1),
(2) Date: Sep. 10, 2018

(87) PCT Pub. No.: WO2017/155390
PCT Pub. Date: Sep. 14, 2017

(65) Prior Publication Data
US 2019/0082702 A1    Mar. 21, 2019

(30) Foreign Application Priority Data
Mar. 11, 2016 (NL) ...................... 2016419

(51) Int. Cl.
*A22C 7/00* (2006.01)
*B08B 9/023* (2006.01)
(Continued)

(52) U.S. Cl.
CPC ............ *A22C 7/0069* (2013.01); *A22C 7/003* (2013.01); *B08B 3/024* (2013.01); *B08B 9/023* (2013.01); *B08B 9/0321* (2013.01)

(58) Field of Classification Search
CPC ..... A22C 7/003; A22C 7/0038; A22C 7/0069; A22C 7/0076; A22C 7/0015; A23P 30/10;
(Continued)

(56) References Cited

U.S. PATENT DOCUMENTS 4,975,039 A    12/1990 Dare et al.
2013/0273192 A1*  10/2013 Van Gerwen ........... B08B 9/032
                                                        425/317
(Continued)

FOREIGN PATENT DOCUMENTS

EP    1 017 182 A1    10/1980
EP    2 468 104 A1    6/2012
(Continued)

OTHER PUBLICATIONS

International Search Report, issued in PCT/NL2017/050135, dated Jul. 28, 2017.
(Continued)

*Primary Examiner* — Mikhail Kornakov
*Assistant Examiner* — Richard Z. Zhang
(74) *Attorney, Agent, or Firm* — Birch, Stewart, Kolasch & Birch LLP

(57) ABSTRACT

A method for cleaning and/or evaluating a food products mould drum and a combination of such a food products mould drum and a mould drum cleaning and/or evaluating device are disclosed. The mould drum cleaning and/or evaluating device includes one or more pressure housings arranged against the outside of and over one or more mould cavities and form, together with the mould drum, an outside chamber. The outside chamber includes a chamber port (Continued)

connectable to a pressure line of a fluid circuit, and the mould drum includes a passage port connectable to a return line of the fluid circuit. Cleaning/evaluating occurs by allowing a pressurized fluid stream to enter via the chamber port into mould cavities and then via a wall part porous structure through a passage, and exit via the passage port to the return line of the fluid circuit.

16 Claims, 7 Drawing Sheets

(51) Int. Cl.
*B08B 3/02* (2006.01)
*B08B 9/032* (2006.01)

(58) Field of Classification Search
CPC .. B08B 3/02; B08B 3/024; B08B 3/04; B08B 3/10; B08B 9/00; B08B 9/02; B08B 9/023; B08B 9/027; B08B 9/032; B08B 9/0321; B08B 9/0328; B08B 9/08
See application file for complete search history.

(56) References Cited

U.S. PATENT DOCUMENTS

| | | | |
|---|---|---|---|
| 2016/0066760 A1* | 3/2016 | Citsay | B08B 1/04 134/6 |
| 2017/0050332 A1 | 2/2017 | Bauer et al. | |

FOREIGN PATENT DOCUMENTS

| | | |
|---|---|---|
| WO | WO 00/30458 A1 | 6/2000 |
| WO | WO 2004/002229 A2 | 1/2004 |
| WO | WO 2005/107481 A2 | 11/2005 |
| WO | WO 2011/131372 A2 | 10/2011 |
| WO | WO 2012/107236 A2 | 8/2012 |
| WO | WO 2012/107236 A3 | 8/2012 |
| WO | WO 2015/162182 A1 | 10/2015 |

OTHER PUBLICATIONS

Written Opinion of the International Searching Authority, issued in PCT/NL2017/050135, dated Jul. 28, 2017.

* cited by examiner

METHOD FOR CLEANING AND/ OR EVALUATING A FOOD PRODUCTS MOULD DRUM AND A COMBINATION OF SUCH A FOOD PRODUCTS MOULD DRUM AND A MOULD DRUM CLEANING AND/ OR EVALUATING DEVICE

FIELD OF THE INVENTION

The present invention relates to a method for cleaning and/or evaluating a food products mould drum and a combination of such a food products mould drum and a mould drum cleaning and/or evaluating device.

The invention is in particular for the moulding of products from a meat mass, such as for hamburgers and the like, but other edible masses, for example of fish, potato, dough, etc. are also conceivable.

BACKGROUND OF THE INVENTION

WO00/30458 and WO2004/002229 of the same applicant have disclosed systems having a production device and a mould drum and provided with at least one mould cavity, the frame supporting the mould member, and furthermore provided with mass feed means for feeding the mass to the one or more mould cavities of the mould member. U.S. Pat. No. 4,975,039, for example, has disclosed a system having a mould member designed as a mould plate which can move to and fro. WO2005/107481 of the same applicant discloses a system further comprising a cleaning device.

OBJECT OF THE INVENTION

It is an object of the invention to propose an alternative in the area of the cleaning and/or evaluation of systems of this type.

SUMMARY OF THE INVENTION

This object is achieved by a method for cleaning and/or evaluating a food products mould drum having an outer drum surface provided with multiple recessed mould cavities, each with a mould cavity wall formed at least in part by a wall part with a porous structure, the mould drum further being provided with one or more passage ports, which are via one or more passages and via the wall part porous structures in fluid communication with the mould cavities; which mould drum has been become soiled in a process of moulding three-dimensional products from a mass of one or more food starting materials involving rotating the mould drum and feeding the mass to the mould cavities and ejecting formed food products from said mould drum;
the method comprising the steps of:
providing a mould drum cleaning and/or evaluating device with a fluid circuit comprising a pump creating a pressurized fluid stream in a pressure line of the fluid circuit, the circuit further comprising a return line;
arranging one or more pressure housings against the outside of and over one or more mould cavities, so as to form together with the mould drum an outside chamber, the outside chamber having a chamber port in fluid communication with the at least one mould cavity;
connecting the chamber port to the pressure line of the fluid circuit, and the passage port to the return line of the fluid circuit;
cleaning and/or evaluating the at least one mould cavity in a first phase by allowing the pressurized fluid stream to enter via the chamber port into the mould cavities and then via the wall part porous structure through the at least one passage, and exit via the passage port to the return line of the fluid circuit.

This object is further achieved by the combination of:
a food products mould drum having an outer drum surface provided with multiple recessed mould cavities, each with a mould cavity wall formed at least in part by a wall part porous structure, the mould drum further being provided with one or more passage ports, which are via one or more passages and via the wall part porous structures in fluid communication with the mould cavities; which mould drum has been become soiled in a process of moulding three-dimensional products from a mass of one or more food starting materials involving rotating the mould drum and feeding the mass to the mould cavities and ejecting formed food products from said mould drum;
a mould drum cleaning and/or evaluating device with a fluid circuit comprising a pump creating a pressurized fluid stream in a pressure line of the fluid circuit, the circuit further comprising a return line;
wherein the mould drum cleaning device further comprises:
one or more pressure housings adapted to be arranged against the outside of and over one or more mould cavities and adapted to form, together with the mould drum, an outside chamber, the outside chamber having a chamber port adapted to be in fluid communication with the at least one mould cavity; the chamber port being adapted to be connected to the pressure line of the fluid circuit;
the passage port being adapted to be connected to the return line of the fluid circuit; such that in a first phase the pressurized fluid stream is allowed to enter via the chamber port into the mould cavities and then via the wall part porous structure through the at least one passage, and exit via the passage port to the return line of the fluid circuit.

In practice, a food products mould drum has to be cleaned every day. In a production cycle, the production device moulds three-dimensional products from a mass of one or more food starting materials which are suitable for consumption, by rotating the mould drum and feeding the mass via the cavity opening to the mould cavities with a mass feed device. This process may take two production shifts of 8 hours each. During the production cycle, mass has been fed into the cavities and has possibly entered wall parts with a porous structure. Optionally, during the production cycle, mould cavities are flushed between batches of mass. Flushing is e.g. done using water/air, possibly filtered water/air. After a production cycle, the mould drum is cleaned by a cleaning device in a third production shift of 8 hours. This includes possible removal and installation of the mould drum from and into a production device, the arrangement and removal of the pressure housings etc. etc.

During cleaning, contaminations such as food material remnants and particles originating from the flushing process, such as filter particles, are to be removed from the mould cavities including the wall part porous structures. In the known cleaning device, as disclosed in WO2005/107481, the cleaning device feeds cleaning fluid to one or more of the passages in the mould drum. In this way, a cleaning fluid stream enters via the at least one passage and flows through the wall part porous structure into the mould cavities. Any food material remnant which has stuck to or inside the porous wall part of a mould cavity is forced out and discharged.

According to the method for cleaning and/or evaluation and cleaning and/or evaluation device of the present invention, it is possible to establish a first phase wherein the pressurized fluid stream is made to enter via the chamber port into the mould cavities and then via the wall part porous structure through the at least one passage, and exit via the passage port to the return line of the fluid circuit.

In embodiments, in the first phase a pressure drop over the porous wall of said (non-cleaned) mould drum is measured/evaluated, which is indicative of the soil of the mould drum. As such the contamination is determined, as the resistance that the pressurized fluid stream encounters is an indication of the contamination. Preferably, said measurements are displayed and/or logged. With this measurement, it is possible to determine a cleaning process that is tuned to the amount of soil/contamination. Also, the cleaning routine can be adjusted.

In alternative embodiments, the first phase is a cleaning phase. Advantageously, this first cleaning phase is possible in addition to the known cleaning phase wherein a cleaning fluid stream is made to enter into the at least one passage and flow through the wall part porous structure into the mould cavities.

Such a cleaning and/or evaluation method and device provides an alternative to the known device and technique and may advantageously result in a more efficient, e.g. a faster cleaning process.

According to the present invention, the mould drum cleaning and/or evaluating device comprises one or more pressure housings adapted to be arranged against the outside of and over one or more mould cavities and adapted to form, together with the mould drum, an outside chamber.

The outside chamber has a chamber port adapted to be in fluid communication with the at least one mould cavity; the chamber port being adapted to be connected to the pressure line of the cleaning fluid circuit.

In embodiments, the chamber port is formed in the pressure housing. Alternatively, the chamber port is formed in the mould drum, which will be elucidated below.

In a possible embodiment, a single pressure housing is provided, against the outside of and over all mould cavities. The mould drum may be in an essentially horizontal orientation, an essentially vertical or alternative orientation. The pressure housing can be of a one-part or multiple part construction.

For example, the pressure housing is embodied as a cylindrical vessel with an opening at a head end thereof, adapted to receive a mould drum therein. In an alternative embodiment, the housing comprises two parts, adapted to receive the mould drum when the parts are in an open configuration and clean the mould drum when the parts are interconnected, similar to box having a lid.

In an alternative configuration, multiple pressure housings are adapted to be arranged in a circumferential array around the outer drum surface.

In embodiments, the mould drum cleaning device is provided with a frame into which the one or more pressure housings are provided. A rotating drum support is advantageously provided, e.g. embodied as an elongated shaft onto which the drum may be slid. The rotating drum support advantageously allows rotation of the food products mould drum, preferably a stepwise rotation.

In embodiments, a pressure housing is provided movable in the frame, and an actuator is provided associated with a pressure housing to position the pressure housing against the outer drum surface. When positioning the mould drum in the cleaning device, the actuator advantageously positions the pressure housing at a retracted, remote parking position. Once the mould drum is in position, the actuator moves the pressure housing to the operative position against the mould drum.

Possibly, the pressure housing is adapted to be arranged against the outside of the mould cavities at a pressure advantageously exceeding 1 bar. In embodiments, a pressure housing is provided with a sealing member, possibly an inflatable sealing member, to be arranged against the outside of the (row of) mould cavities.

In embodiments, the outer drum surface is provided with multiple rows of mould cavities, and wherein a pressure housing is adapted to be positioned against the outside of and over a row of mould cavities.

In a possible configuration, a movable partition is provided in a pressure housing, to split a single pressure housing into two pressure housings, advantageously over separate rows of mould cavities, allowing the pressure housings to be arranged in a circumferential array around the outer drum surface.

Advantageously, the mould drum is rotatable during cleaning and/or evaluation, allowing distinct phases, including cleaning phases, to be consecutively performed in the multiple pressure housings. It is also conceivable that in the array, e.g. above one or more rows of mould cavities, no pressure housing is provided. Here a cleaning phase is possible as is known from the art, i.e. a cleaning fluid stream which is made to enter into the at least one passage and flow through the wall part porous structure into the mould cavities.

According to the invention, the distinct phases, including cleaning phases includes the first phase in which a pressurized fluid stream enters via the chamber port into the mould cavities and then via the wall part porous structure through the at least one passage, and exits via the passage port to the return line of the fluid circuit.

Advantageously, the distinct cleaning phases also include a second cleaning phase in which a (pressurized) cleaning fluid stream enters into the at least one passage and flows through the wall part porous structure into the mould cavities.

In embodiments, the distinct phases include distinct fluids. For example, in and embodiment comprising four phases, consecutively a first evaluation phase, e.g. soil determination, a first and second cleaning phase are performed comprising a cleaning liquid, and finally a drying phase including heated air to dry the mould drum. It is also conceivable that first a heated gas is allowed to flow through the wall part porous structure, followed by cleaning with a cleaning liquid comprising a detergent.

In a possible embodiment, a phase wherein use is made of heated fluid is followed by a cooling off phase, possibly but not necessarily involving a cooling fluid.

A possible method according to the present invention comprises the steps of arranging multiple pressure housings in a circumferential array around the outer drum surface; and rotating the mould drum during cleaning and/or evaluation, such that distinct phases are consecutively performed.

In an alternative embodiment, the outer drum surface is provided with multiple cylinder rings of mould cavities, and wherein at least two housings are adapted to be positioned against the outside of and over mould cavities of adjacent cylinder rings. In embodiments, the chamber port of one of the pressure housings, or the pressure port of one of the mould cavities is adapted to be closed. As such, in a cleaning phase, a pressurized fluid stream is forced from the wall part porous structure of a mould cavity to the wall part porous structure of a mould cavity of an adjacent cylinder ring.

In yet an alternative embodiment, a pressure housing further comprises one or more nozzles connected to a cleaning fluid source, allowing a cleaning phase wherein cleaning fluid is sprayed into the mould cavities. It is conceivable that one of multiple pressure housings is provided with such nozzles, but also that the combination of the invention comprises just one pressure housing, which is provided with one or more nozzles. The cleaning fluid source is possibly, but not necessarily, the cleaning fluid circuit of the present invention. In embodiments multiple fluid circuits are provided. For example a first fluid circuit is applied in a first (cleaning) phase, and a second alternative fluid circuit in a second (cleaning) phase.

A possible method according to the present invention comprises the steps of providing a pressure housing with one or more nozzles; connecting the one or more nozzles to a cleaning fluid source; and cleaning in a cleaning phase wherein cleaning fluid is sprayed into the mould cavities.

Possibly, the chamber port and the passage port are closed during spraying such that the outside chamber is filled with cleaning fluid. In advantageous embodiments, the mould drum is rotatable in the cleaning device.

In yet an alternative embodiment, a pressure housing further comprises a bubble diffuser in the outside chamber, connected to a cleaning gas source, such as air, ozone. In the first cleaning phase the pressurized fluid stream is provided with bubbles. Hence, prior to entering the wall part porous structure bubbles such as microbubbles or nanobubbles are added to the cleaning fluid, which may result in a more efficient cleaning process. Such a bubble diffuser advantageously comprises walls having microscopic openings.

A possible method according to the present invention comprises the steps of providing a pressure housing with a bubble diffuser; connecting the bubble diffuser to a cleaning gas source; and cleaning in the first cleaning phase by providing the pressurized fluid stream with bubbles.

According to the invention, a food products mould drum has an outer drum surface provided with multiple recessed mould cavities, each with a mould cavity wall formed at least in part by a wall part with a porous structure, the mould drum further being provided with one or more passage ports, which are via one or more passages and via the wall part porous structures in fluid communication with the mould cavities.

In embodiments, the drum is provided with multiple rows of mould cavities. Advantageously, a row extends essentially in the longitudinal direction of the drum. In embodiments, the passages are provided parallel and essentially below a row of mould cavities.

Advantageously, the passage port is formed at a head end of the mould drum, where the passage opens out.

In embodiments, also a chamber port is provided at a head end of the mould drum, creating a direct fluid communication between the outer drum surface and hence the outside chamber and the head end of the mould drum.

In embodiments, the mould drum comprises a porous outer cylinder having recessed mould cavities. The pores at the outer drum surface are closed, e.g. by smearing. An inner cylinder provided with passages is provided adjacent the porous outer cylinder, allowing the passages to be in communication with the mould cavities via the wall part porous structures.

Alternatively, it is possible to provide a non-porous mould drum with recesses, in which recesses porous inserts comprising one or more mould cavities are provided. Possibly, an insert comprises a row of mould cavities, the row preferably extending essentially in the longitudinal direction of the drum.

In embodiments, the mould drum is provided with an identification, and wherein a recognition device is provided in connection with the mould drum cleaning and/or evaluating device to recognise the identification of the mould drum.

Advantageously, a control device is provided in connection with the recognition device. As such, the cleaning and/or evaluation process is controllable on the basis of the identification of the mould drum. Advantageously, the control device is provided with a memory, in which a database comprising the mould identification and related soil information and cleaning processes is stored. This allows for example monitoring of the contamination of a mould drum. In addition, it may allow selecting a cleaning process from a memory on the basis of the measured soil contamination a mould drum.

The food products mould drum is applicable in a process of moulding three-dimensional products from a mass of one or more food starting materials involving rotating the mould drum and feeding the mass to the mould cavities and ejecting formed food products from said mould drum, e.g. via a mass feed member. During moulding, the mould drum, in particular the mould cavities including the wall part porous structures, become soiled.

During cleaning, food material remnants are to be removed. According to the invention, as was known in the art, a mould drum cleaning and/or evaluating device is provided, with a fluid circuit comprising a pump creating a pressurized fluid stream in a pressure line of the fluid circuit, the circuit further comprising a return line.

In the known mould drum cleaning devices, during cleaning a cleaning fluid stream is made to enter into the at least one passage and flow through the wall part porous structure into the mould cavities. Such a cleaning step, also possible in embodiments of the present invention, is referred to as "a second cleaning phase".

According to the invention, an opposite fluid stream can be established, referred to as 'a first phase', which is possibly a first cleaning phase. During the first phase the pressurized fluid stream is allowed to enter via the chamber port into the mould cavities and then via the wall part porous structure through the at least one passage, and exit via the passage port to the return line of the cleaning fluid circuit.

A possible method according to the present invention further comprises the step of cleaning the at least one mould cavity in a second cleaning phase by allowing a cleaning fluid stream to enter into the at least one passage and flow through the wall part porous structure into the mould cavities, wherein the first and second cleaning phase are alternately carried out.

In embodiments of the present invention, a filter is provided in the pressure line to clean the liquid.

The cleaning fluid may comprise a liquid containing a detergent, which can be any type of suitable detergent adapted to remove food material remnants. In embodiments, it is conceivable that the cleaning fluid comprises a gas, such as air, ozone, sulphur dioxide, etc. etc. To remove calcium, an acidic liquid may be applied. It is also conceivable that the cleaning fluid is pure water.

In embodiments, a heat element and possibly also a temperature sensor is provided in the fluid circuit, to obtain a heated fluid. Thus, a heated liquid or heated gas is allowed to flow through the wall part porous structures.

Advantageously, the fluid circuit further comprises a fluid reservoir or tank, which may be atmospheric or pressurized.

Possibly, the fluid circuit is provided with a pressure valve which is connected to a control device, such that the pressure of the pressurized fluid stream is controllable. An increase or decrease in fluid pressure over time can be effected, or e.g. a fluid pressure adapted to the type or use of the mould drum.

In embodiments, a pressure sensor is provided to determine the pressure in the outside chamber. It is conceivable that the pressure sensor is provided in the pressure line, but also that the pressure sensor is provided in the outside chamber. Advantageously, the pressure sensor is connectable to a control device. In embodiments, the pressure valve, and thus the pressure of the pressurized fluid stream, is controllable on the basis of input from the pressure sensor. For example, when the wall part porous structure is clogged, the pressure in the outside chamber may be relatively high. The pressure valve may consequently be set to increase the pressure of the pressurized fluid stream.

This opposed pressurized fluid stream according to the invention is possible by arranging one or more pressure housings against the outside of and over one or more mould cavities, so as to form together with the mould drum, an outside chamber, the outside chamber having a chamber port in fluid communication with the at least one mould cavity, and by connecting the chamber port to the pressure line of the fluid circuit, and the passage port to the return line of the fluid circuit.

In a possible cleaning method according to the present invention, the first phase is a cleaning phase, and a first and second cleaning phase are alternatively carried out.

In embodiments, the fluid circuit further comprises a valve assembly in connection with the pressure line and the return line, comprising a first valve port adapted to be in fluid connection with the chamber port and a second valve port in fluid connection with the passage port.

Such a valve assembly enables a switch between the first phase according to the invention and the second known, opposed cleaning phase. Advantageously, the valve assembly is operable by a control device, thereby controlling the first and second cleaning phase.

In embodiments, a single control device is provided, receiving input from the recognition device and/or the pressure sensor and/or a temperature sensor and/or a memory. The control device is adapted to control the cleaning and/or evaluation process, in particular control the pressure valve, valve assembly and/or heat element.

The present invention further relates to a method for cleaning a food products mould drum having an outer drum surface provided with multiple recessed mould cavities, each with a mould cavity wall formed at least in part by a wall part with a porous structure, the mould drum further being provided with one or more passage ports, which are via one or more passages and via the wall part porous structures in fluid communication with the mould cavities;

which mould drum has been become soiled in a process of moulding three-dimensional products from a mass of one or more food starting materials involving rotating the mould drum and feeding the mass to the mould cavities and ejecting formed food products from said mould drum;

the method comprising the steps of:

providing a mould drum cleaning device with a cleaning fluid circuit comprising a pump creating a pressurized cleaning fluid stream in a pressure line of the cleaning fluid circuit, the circuit further comprising a return line;

characterized by the steps of:

arranging one or more pressure housings against the outside of and over one or more mould cavities, so as to form together with the mould drum an outside chamber, the outside chamber having a chamber port in fluid communication with the at least one mould cavity;

connecting the chamber port to the pressure line of the cleaning fluid circuit, and the passage port to the return line of the cleaning fluid circuit;

cleaning the at least one mould cavity in a first cleaning phase by allowing the pressurized fluid stream to enter via the chamber port into the mould cavities and then via the wall part porous structure through the at least one passage, and exit via the passage port to the return line of the cleaning fluid circuit.

The invention further relates to the combination of:

a food products mould drum having an outer drum surface provided with multiple recessed mould cavities, each with a mould cavity wall formed at least in part by a wall part porous structure, the mould drum further being provided with one or more passage ports, which are via one or more passages and via the wall part porous structures in fluid communication with the mould cavities; which mould drum has been become soiled in a process of moulding three-dimensional products from a mass of one or more food starting materials involving rotating the mould drum and feeding the mass to the mould cavities and ejecting formed food products from said mould drum;

a mould drum cleaning device with a cleaning fluid circuit comprising a pump creating a pressurized cleaning fluid stream in a pressure line of the cleaning fluid circuit, the circuit further comprising a return line;

characterized in that the mould drum cleaning device further comprises:

one or more pressure housings adapted to be arranged against the outside of and over one or more mould cavities and adapted to form, together with the mould drum, an outside chamber, the outside chamber having a chamber port adapted to be in fluid communication with the at least one mould cavity; the chamber port being adapted to be connected to the pressure line of the cleaning fluid circuit;

the passage port being adapted to be connected to the return line of the cleaning fluid circuit;

such that in a first cleaning phase the pressurized fluid stream is allowed to enter via the chamber port (36) into the mould cavities and then via the wall part porous structure through the at least one passage (7), and exit via the passage port to the return line of the cleaning fluid circuit.

The invention further relates to a method for cleaning a food products mould drum having an outer drum surface provided with multiple recessed mould cavities, each with a mould cavity wall formed at least in part by a wall part with a porous structure, the mould drum further being provided with one or more passage ports, which are via one or more passages and via the wall part porous structures in fluid communication with the mould cavities;

which mould drum has been become soiled in a process of moulding three-dimensional products from a mass of one or more food starting materials involving rotating the mould drum and feeding the mass to the mould cavities and ejecting formed food products from said mould drum;

the method comprising the steps of:

providing a mould drum cleaning and/or evaluating device with a fluid circuit comprising a pump creating a pressurized fluid stream in a pressure line of the fluid circuit, the circuit further comprising a return line;

characterized by the steps of:

arranging one or more housings against the outside of and over one or more mould cavities, so as to form together with the mould drum an outside chamber, the outside chamber having a discharge port and a chamber port in fluid communication with the at least one mould cavity;

connecting the chamber port to the pressure line of the fluid circuit, and the discharge port with the return line of the fluid circuit;

cleaning the at least one mould cavity in a first phase by allowing the pressurized fluid stream to enter via the chamber port into the mould cavities and exit via the discharge port to the return line of the fluid circuit.

The invention further relates to a method for cleaning a food products mould drum having an outer drum surface provided with multiple recessed mould cavities, each with a mould cavity wall formed at least in part by a wall part with a porous structure, the mould drum further being provided with one or more passage ports, which are via one or more passages and via the wall part porous structures in fluid communication with the mould cavities;

which mould drum has been become soiled in a process of moulding three-dimensional products from a mass of one or more food starting materials involving rotating the mould drum and feeding the mass to the mould cavities and ejecting formed food products from said mould drum;

the method comprising the steps of:

arranging one or more housings against the outside of and over one or more mould cavities, so as to form together with the mould drum an outside chamber, the outside chamber having a radiation source;

cleaning the at least one mould cavity in a first phase by allowing radiation in the pressure housing.

The invention further relates to the combination of:

a food products mould drum having an outer drum surface provided with multiple recessed mould cavities, each with a mould cavity wall formed at least in part by a wall part porous structure, the mould drum further being provided with one or more passage ports, which are via one or more passages and via the wall part porous structures in fluid communication with the mould cavities; which mould drum has been become soiled in a process of moulding three-dimensional products from a mass of one or more food starting materials involving rotating the mould drum and feeding the mass to the mould cavities and ejecting formed food products from said mould drum;

a mould drum cleaning and/or evaluating device with a fluid circuit comprising a pump creating a pressurized fluid stream in a pressure line of the fluid circuit, the circuit further comprising a return line;

characterized in that the mould drum cleaning and/or evaluating device further comprises:

one or more housings adapted to be arranged against the outside of and over one or more mould cavities and adapted to form, together with the mould drum, an outside chamber, the outside chamber having a discharge port adapted to be connected to the return line of the fluid circuit and a chamber port adapted to be in fluid communication with the at least one mould cavity; the chamber port being adapted to be connected to the pressure line of the fluid circuit;

such that in a first phase the pressurized fluid stream is allowed to enter via the chamber port into the mould cavities and exit via the discharge port to the return line of the fluid circuit.

The invention further relates to the combination of:

a food products mould drum having an outer drum surface provided with multiple recessed mould cavities, each with a mould cavity wall formed at least in part by a wall part porous structure (5), the mould drum further being provided with one or more passage ports, which are via one or more passages and via the wall part porous structures in fluid communication with the mould cavities; which mould drum has been become soiled in a process of moulding three-dimensional products from a mass of one or more food starting materials involving rotating the mould drum and feeding the mass to the mould cavities and ejecting formed food products from said mould drum; one or more housings adapted to be arranged against the outside of and over one or more mould cavities and adapted to form, together with the mould drum, an outside chamber.

Advantageously, multiple housings are adapted to be arranged in a circumferential array around the outer drum surface, and wherein the mould drum is rotatable. In the housings, distinct cleaning and/or evaluation phases can consecutively performed.

Possibly, a mould drum cleaning and/or evaluating device with a fluid circuit according to another aspect of the invention is provided in connection with one or more pressure housings.

It is also conceivable that a pressure housing comprises a radiation source, allowing radiation to take place. Such an embodiment does not require a mould drum cleaning and/or evaluating device. Radiation may result in local heating of the mould drum, possibly up to a pyrolysis temperature.

The above-described aspects of the invention can be applied in isolation, or in combination with other aspects of the invention.

The invention is further elucidated in relation to the drawings.

DETAILED DESCRIPTION OF EMBODIMENTS

Figure 1:
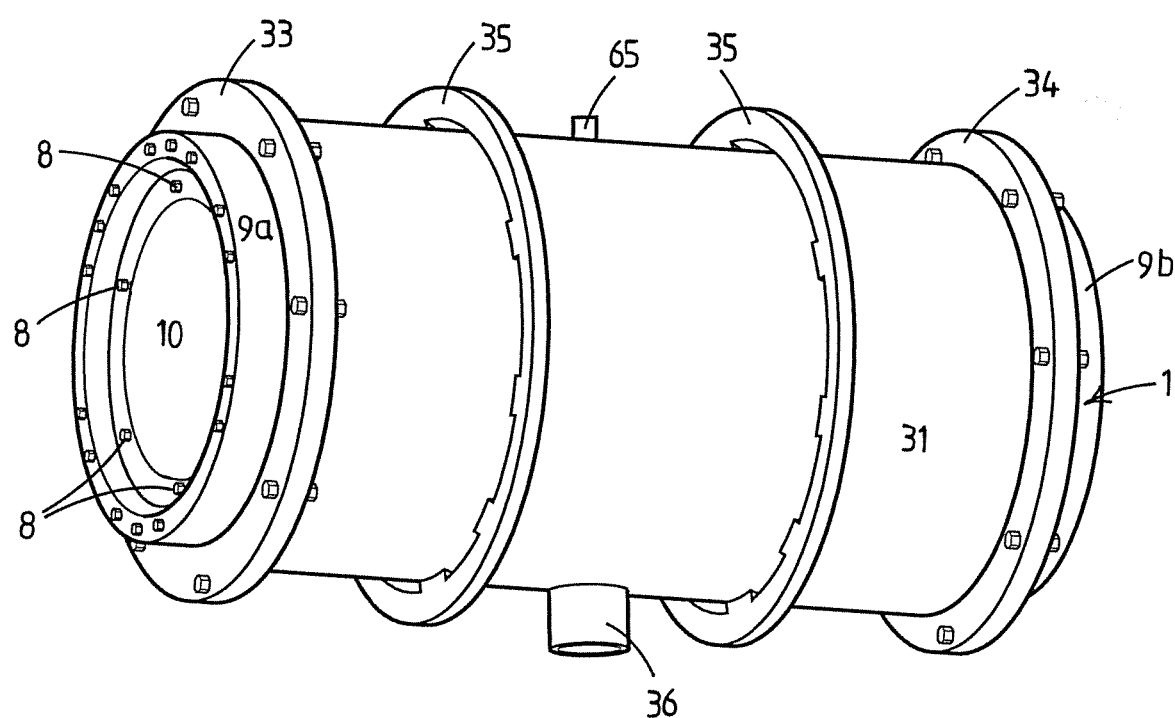
FIG. 1 is a perspective view of a possible embodiment of a combination of food products mould drum and mould drum cleaning and/or evaluating device.
Figure 2:
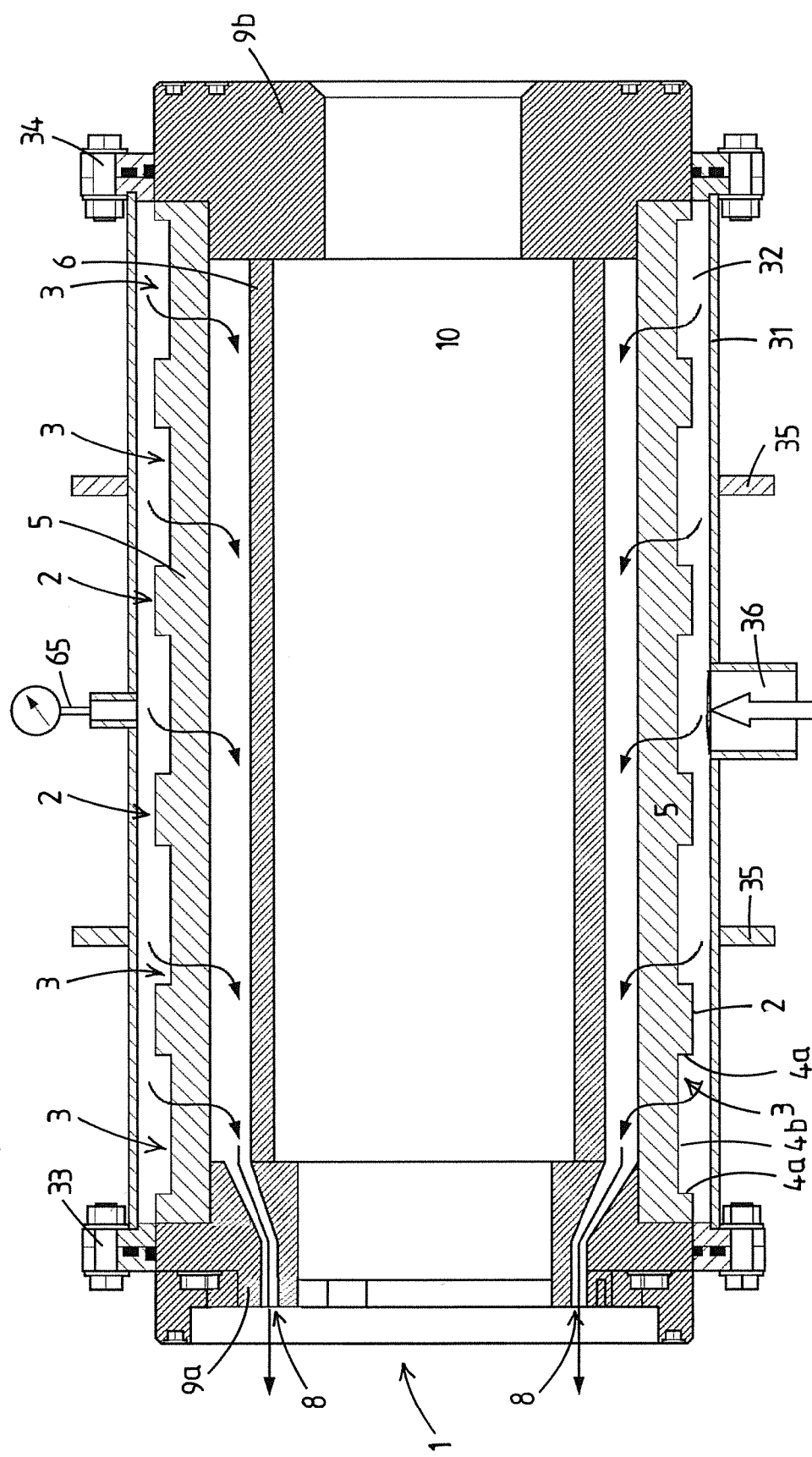
FIG. 2 shows the combination of FIG. 1 in cross section, in a first phase.
Figure 3:
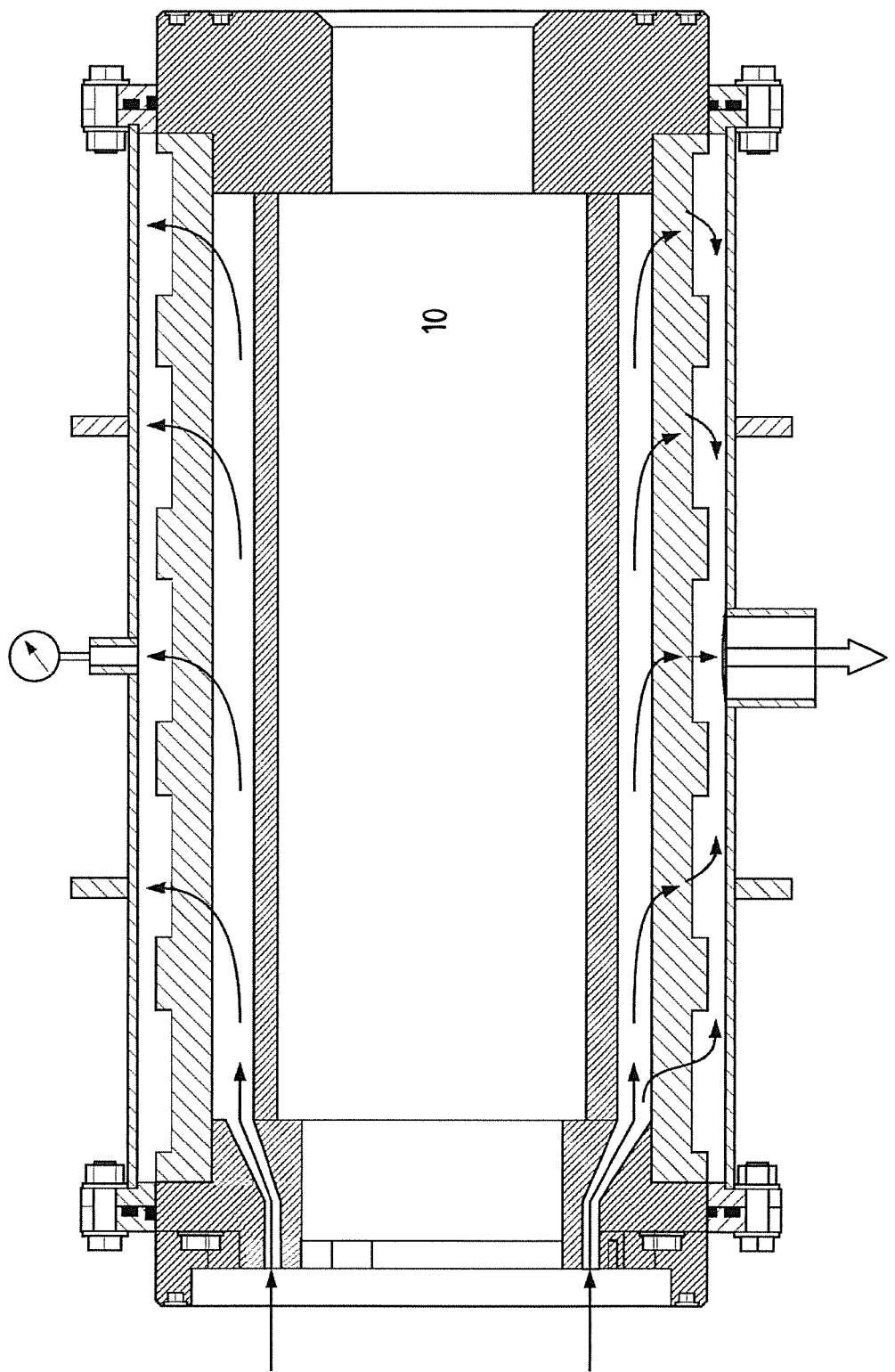
FIG. 3 shows the combination of FIG. 1 in cross section, in a second cleaning phase.

In FIGS. 1, 2 and 3 the combination of a food products mould drum 1 and a mould drum cleaning and/or evaluating device 30 is shown.

The food products mould drum 1 has a porous outer cylinder 5, with an outer drum surface 2 provided with multiple recessed mould cavities 3. Each mould cavity has a mould cavity wall 4a, 4b, formed at least in part by a wall part with a porous structure. Here, the mould cavity wall 4a is the side wall of the cavity, and the mould cavity wall 4b is the bottom of the mould cavity.

The food products mould drum 1 further comprises an inner cylinder 6, provided adjacent the porous outer cylinder 5, which is provided with one or more passages 7. These passages 7 are via the wall part porous structures 4a, 4b in communication with the mould cavities 3.

The shown embodiment of the food products mould drum 1 further comprises two head ends 9a, 9b. In head end 9a, passage ports 8 are provided, which are via the one or more passages 7 and via the wall part porous structures (5) in fluid communication with the mould cavities (3). Accordingly, a fluid is permitted to be supplied to said mould cavities and/or suction can take place via said passage, and forced through the wall part porous structures.

The food products mould drum 1 has a hollow central axis 10, adapted to be positioned onto a spindle, for example in a production device.

The food products mould drum 1 is adapted to be used in a process of moulding three-dimensional products from a mass of one or more food starting materials involving rotating the mould drum and feeding the mass to the mould cavities and ejecting formed food products from said mould drum. During such a production process, in which e.g. hamburgers or chicken nuggets are produced at a large scale, the food products mould drum becomes soiled.

As known in the art, a mould drum cleaning and/or evaluating device 30 may be provided to clean the mould drum and/or determine the soil contamination. Such a mould drum cleaning and/or evaluating device comprises a fluid circuit 50, schematically shown in FIG. 4, comprising a pump 51 creating a pressurized fluid stream in a pressure line 52 of the fluid circuit, the circuit further comprising a return line 55. Here, in the pressure line 52 after the pump 51 a filter 53 is provided to clean the fluid. The shown fluid circuit 50 comprises a fluid reservoir 60, which may be pressurized or under atmospheric pressure. Possibly, the fluid is a cleaning fluid.

In the shown embodiment, according to the present invention, the mould drum cleaning and/or evaluating device 30 comprises a pressure housing 31 adapted to be arranged against the outside of and over the mould cavities 31 and adapted to form, together with the mould drum, an outside chamber 32. Here, the pressure housing 31 is embodied as a cylindrical vessel, into which the mould drum can be inserted and fixed via flanges 33, 34, at the respective head ends 9a, 9b of the mould drum. Further, flanges 35 are provided to provide mechanical strength to the pressure housing 31.

The outside chamber 32 has a chamber port 36 adapted to be in fluid communication with the at least one mould cavity 3. In the embodiments of FIG. 1-4, the chamber port 36 is formed in the pressure housing 31.

Figure 5:
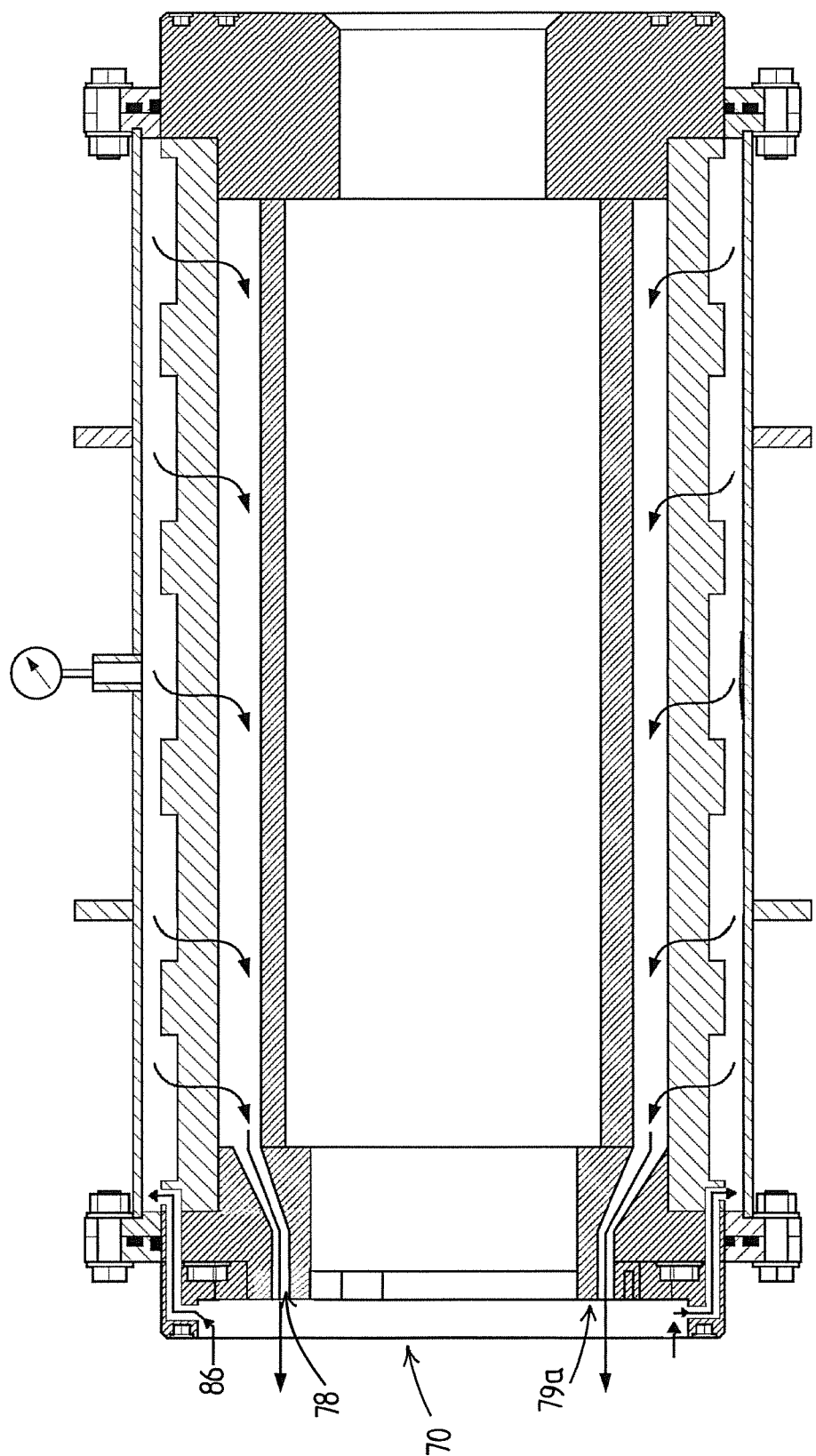
FIG. 5 shows an alternative mould drum in combination with a cleaning and/or evaluation device in cross section, similar to FIG. 2.

In an alternative embodiment, as shown in FIG. 5, a chamber port 86 is formed in the head end 79a of the mould drum 70, adjacent the passage ports 78.

According to the present invention, the chamber port 36 is adapted to be connected to the pressure line 52 of the fluid circuit, and the passage port 8 is adapted to be connected to the return line 55 of the fluid circuit. As such, in a first phase as depicted in FIG. 2, e.g. a cleaning phase, the pressurized fluid stream is allowed to enter via the chamber port 36 into the mould cavities 3 and then via the wall part porous structure 4a, 4b through the at least one passage 7, and exit via the passage port 8 to the return line 55 of the fluid circuit.

Figure 4:
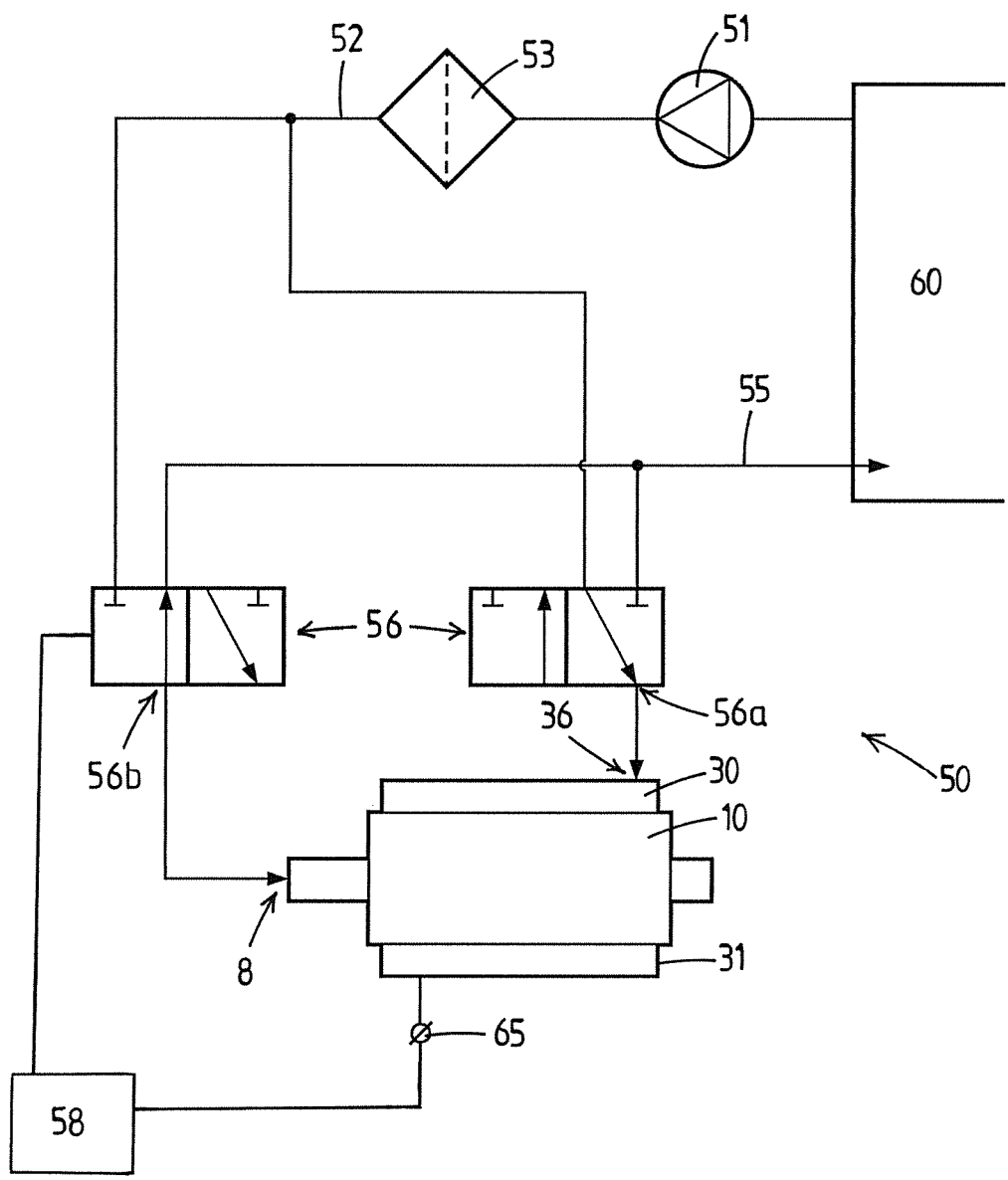
FIG. 4 is a schematic representation of a fluid circuit according to the invention.

Advantageously, as is shown in FIG. 4, the fluid circuit 50 further comprises a valve assembly 56 in connection with the pressure line 52 and the return line 55, comprising a first valve port 56a adapted to be in fluid connection with the chamber port 36 and a second valve port 56b in fluid connection with the passage port 8.

Operation of the valve assembly allows the chamber port 36 to be connected to the return line 55 of the fluid circuit; and the passage port 8 to the pressure line 52 of the fluid circuit. In this set up, e.g. cleaning of the at least one mould cavity is possible in a second cleaning phase, as shown in FIG. 3, wherein a cleaning fluid stream is allowed to enter into the at least one passage 7 and flow through the wall part porous structure 5 into the mould cavities 3. Such a second cleaning phase was known in the art, and the presence of a pressure housing is not a prerequisite to perform such a second cleaning phase.

Advantageously, the valve assembly 56 is operable by a control device, thereby controlling the first phase, e.g. a cleaning phase, and a second cleaning phase. For example, a first and second cleaning phase are alternately carried out.

In the shown embodiment, a pressure sensor 65 is provided in the pressure housing 31 to determine the pressure in the outside chamber 32. Here, the pressure sensor 65 is connected to the control device 58.

Figure 6:
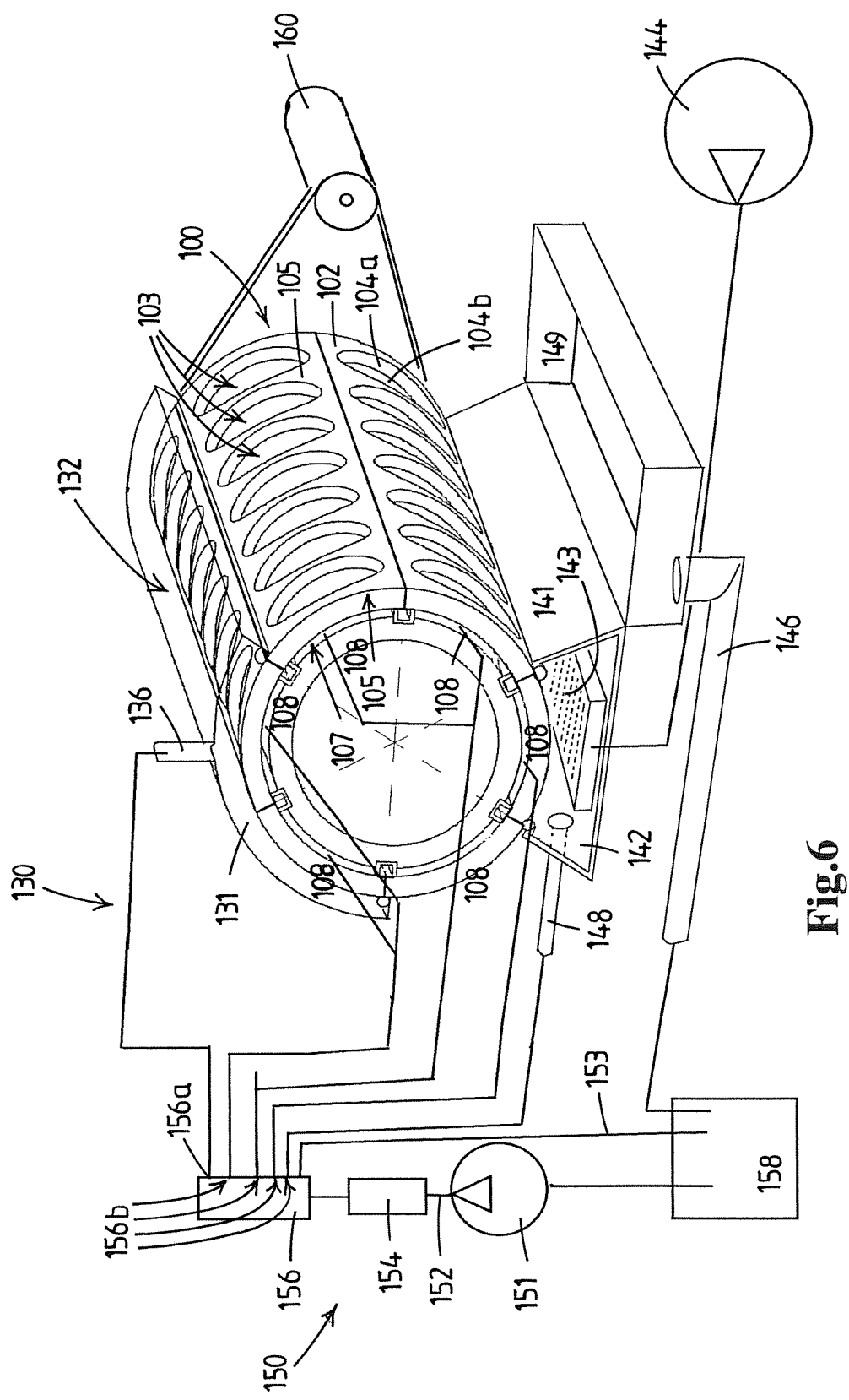
FIG. 6 shows an alternative embodiment of a combination of food products mould drum and mould drum cleaning and/or evaluating device comprising multiple pressure housings.

In FIG. 6 a food products mould drum 100 is shown in a mould drum cleaning and/or evaluating device 130. The food products mould drum 100 is similar to drum 1 of the preceding drawings, and has an outer drum surface 102 provided with multiple recessed mould cavities 103, each with a mould cavity wall 104a,104b formed at least in part by a wall part porous structure 105, the mould drum further being provided with one or more passage ports 108, which are via one or more passages 107 and via the wall part porous structures in fluid communication with the mould cavities.

The mould drum cleaning and/or evaluating device 130 has a fluid circuit 150 comprising a pump 151 creating a pressurized fluid stream in a pressure line 152 of the fluid circuit, here provided with a filter 154, the circuit further comprising a return line 153. Here the fluid circuit further comprises a reservoir 158. Advantageously, the fluid circuit 150 further comprises a valve assembly 156 in connection with the pressure line 152 and the return line 153, comprising a first valve port 156a adapted to be in fluid connection with the chamber port 136 and a plurality of second valve ports 156b in fluid connection with the passage ports 108.

The shown mould drum cleaning and/or evaluating device 130 comprises two pressure housings 131 and 141, each arranged in a circumferential array around the outer drum surface against the outside of the mould cavities. A drive 160 is provided to rotate the mould drum 100 during cleaning and/or evaluation, such that distinct phases are consecutively performed. For example, in a first phase the degree of soil contamination is determined, followed by a cleaning phase.

Pressure housing 131 is arranged over two rows of mould cavities and forms an outside chamber 132, having a chamber port 136 in fluid communication with the mould cavities, and also adapted to be connected to the pressure line 152 of the fluid circuit, such that in a first phase the pressurized fluid stream is allowed to enter via the chamber port 136 into the mould cavities 103 and then via the wall part porous structure 104a, 104b through the at least one passage 107, and exit via the passage port 108 to the return line 153 of the fluid circuit.

Pressure housing 141 is arranged over the bottom row of mould cavities and forms an outside chamber 142, having a chamber port 148 in fluid communication with the mould cavities, and also adapted to be connected to the pressure line 152 of the fluid circuit, such that in a first phase the pressurized fluid stream is allowed to enter via the chamber port 148 into the mould cavities 103 and then via the wall part porous structure 104a, 104b through the at least one passage 107, and exit via the passage port 108 to the return line 153 of the fluid circuit.

In addition, pressure housing 141 is provided with a bubble diffuser 143 which is connected to a cleaning gas source 144, here provided with a pump. As such, cleaning in a first cleaning phase occurs by providing the pressurized fluid stream with bubbles.

Alternatively, it is also conceivable that a pressure housing is arranged against the outside of and over one or more mould cavities to form an outside chamber, having jet nozzles in fluid communication with the at least one mould cavity, adapted to be connected to the pressure line of the fluid circuit, to provide a cleaning fluid jet. Possibly, the passage port is connected to the return line of the fluid circuit. Alternatively, it is also conceivable that the pressure housing is provided with a port to remove the fluid, which is e.g. adapted to be connected to the return line of the fluid circuit.

In addition, pressure housing 141 is provided with an drainage port 146, which can be opened and closed as desired. In case the drainage port 146 is closed, the above-described first cleaning phase is allowed to take place. The drainage port 146 enables a cleaning process wherein there is no fluid stream, and the mould cavities are only soaked in stationary cleaning liquid provided with bubbles. Once finished, the mould drum is allowed to rotate to the next angular position, and the stationary cleaning liquid is allowed to return to the cleaning fluid circuit 150. Hence, pressure housing 141 comprises three ports, which can selectively be opened and closed.

In addition, drainage port 146 can be used for the drainage of cleaning fluid that has flown from the passages via the porous structure and exits the mould cavities, i.e. the above-described second cleaning phase. In particular the mould cavities 103 about which no pressure housing is arranged, i.e. the cavities between the pressure housing 132 and 142 may be cleaned from the inside to the outside, as a result of which cleaning fluid will, under the influence of gravity, fall in the sink 149, from which it is allowed to exit via drainage port 146 towards the reservoir 158.

Figure 7:
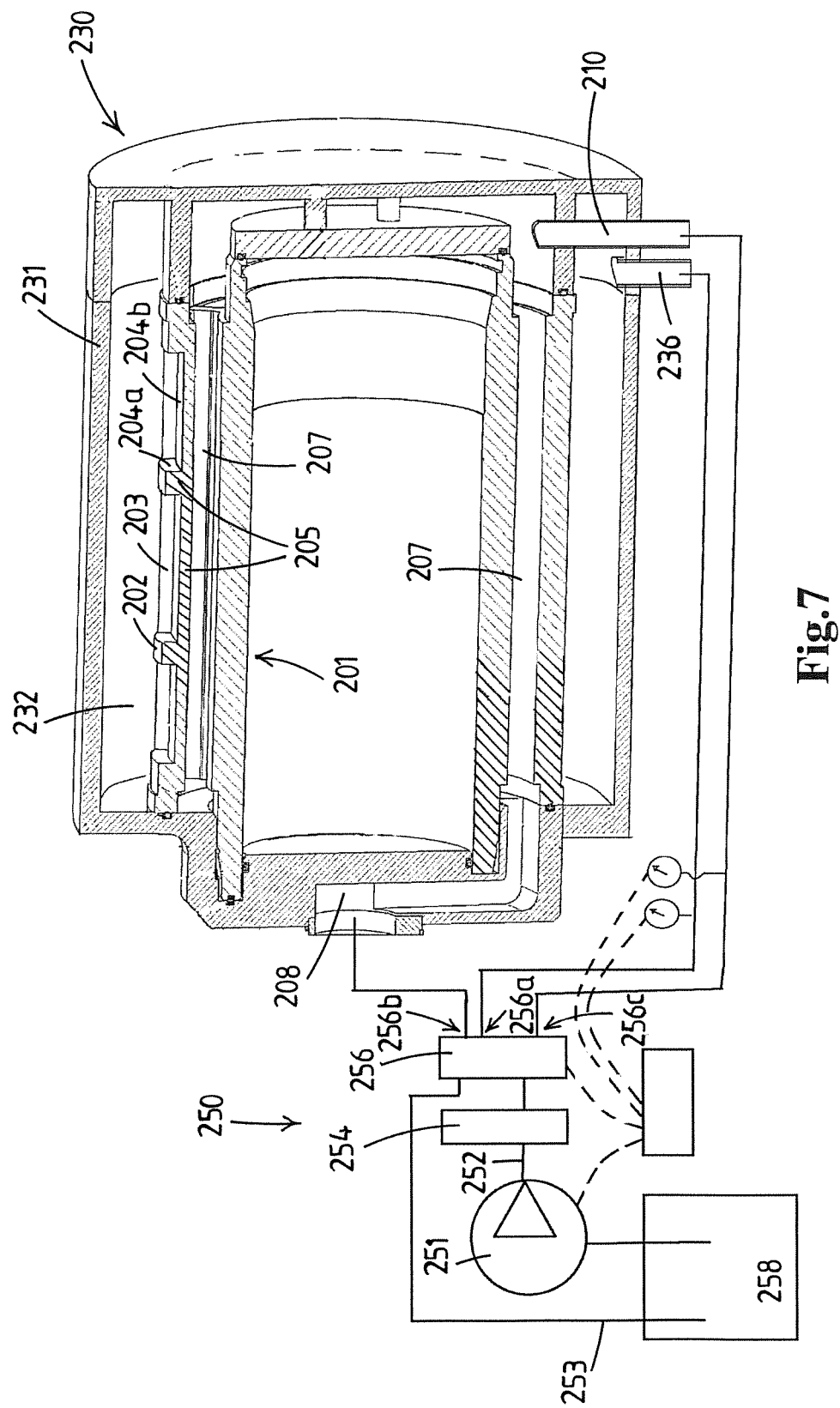
FIG. 7 shows yet an alternative embodiment of a combination of food products mould drum and a mould drum cleaning and/or evaluating device according to the invention.

In FIG. 7 yet another combination of food products mould drum 201 and mould drum cleaning and/or evaluating device 230 is shown. The food products mould drum 201 is similar to drum 1 and 100 of the preceding drawings, and has an outer drum surface 202 provided with multiple recessed mould cavities 203, each with a mould cavity wall 204a, 204b formed at least in part by a wall part porous structure 205, the mould drum further being provided with one or more passage ports 208, which are via one or more passages 207 and via the wall part porous structures 205 in fluid communication with the mould cavities 203. In the shown embodiment, at the opposite end of the passages 107, a secondary passage port 210 is provided.

The mould drum cleaning and/or evaluating device 230 has a fluid circuit 250 comprising a pump 251 creating a pressurized fluid stream in a pressure line 252 of the fluid circuit, here provided with a filter 254, the circuit further comprising a return line 253. Here the fluid circuit further comprises a reservoir 258. Advantageously, the fluid circuit 250 further comprises a valve assembly 256 in connection with the pressure line 252 and the return line 253, comprising a first valve port 256a adapted to be in fluid connection with chamber port 236, a second valve port 256b in fluid connection with the passage ports 208 and a third valve port 256c in fluid connection with secondary passage port 210.

The shown mould drum cleaning and/or evaluating device 230 comprises a pressure housing 231 arranged over the mould cavities and forms an outside chamber 232, having a chamber port 236 in fluid communication with the mould cavities. Chamber port 236 is adapted to be connected to the pressure line 252 of the fluid circuit, such that in a first phase the pressurized fluid stream is allowed to enter via the chamber port 236 into the mould cavities 203 and then via the wall part porous structure 204a, 204b through the at least one passage 207, and exit via the passage port 208 and/or secondary passage port 210 to the return line 253 of the fluid circuit.

In a second cleaning phase a cleaning fluid stream is allowed to enter into the at least one passage 207, via the passage port 208 and/or secondary passage port 210, while closing the other passage port, and flow through the wall part porous structure 205 into the mould cavities 203, and then exit via the outside chamber 232 and the chamber port 236 to the return line 253 of the fluid circuit.

In a possible third cleaning phase, cleaning fluid stream is allowed to enter into the at least one passage 207 via the passage port 208 and exit the passage 207 via secondary passage port 210 or vice versa. Possibly the chamber port 236 is closed. Hence, during this cleaning phase the passages 207 are rinsed by pressurized cleaning fluid.

Possibly, the first phase is a cleaning phase, and the first, second and third cleaning phase are alternately carried out. In a possible cleaning process, primary the passages are rinsed in the above-described third cleaning phase, and subsequently the cavities are cleaned by allowing the pressurized fluid stream to flow from the passages to the outside chamber in the above-described second cleaning phase, and subsequently the cavities are cleaned by allowing the pressurized fluid stream to flow from the outside chamber to the passages in the above-described first cleaning phase. Possibly, the second phase is repeated thereafter, and a sequence of multiple second and first phases is conceivable as well.

The invention claimed is:

1. A method for cleaning and/or evaluating a food products mould drum having an outer drum surface provided with multiple recessed mould cavities, each recessed mould cavity with a mould cavity wall formed at least in part by a wall part with a porous structure, the mould drum further being provided with one or more passage ports, the one or more passage ports being in fluid communication with the multiple recessed mould cavities via one or more passages and via a plurality of said wall part with said porous structure, wherein the mould drum having become soiled in a process of moulding three-dimensional products from a mass of one or more food starting materials, said process involving rotating the mould drum and feeding the mass to the multiple recessed mould cavities and ejecting formed food products from said mould drum, and wherein use is made of a mould drum cleaning and/or evaluating device having a fluid circuit comprising a pump configured to create a pressurized fluid stream in a pressure line of the fluid circuit, the circuit further comprising a return line, the method comprising the steps of:

arranging one or more pressure housings against an outside of and over a selection of one or more of the multiple recessed mould cavities, so as to form together with the mould drum an outside chamber, the outside chamber having a chamber port in fluid communication with the selection of the one or more of the multiple recessed mould cavities;

connecting the chamber port to the pressure line of the fluid circuit, and connecting at least one of the one or more passage ports to the return line of the fluid circuit; and cleaning and/or evaluating the selection of the one or more of the multiple recessed mould cavities in a first phase by causing the pressurized fluid stream to enter via the chamber port into the multiple recessed mould cavities and then via the plurality of said wall part with said porous structure through at least one of the one or more passages, and to exit via the at least one of the one or more passage ports to the return line of the fluid circuit.

2. The method according to claim 1, further comprising the step of cleaning the selection of the one or more of the multiple recessed mould cavities in a second cleaning phase by causing a cleaning fluid stream to enter into said at least one of the one or more passages and flow through the plurality of said wall part with said porous structure into the multiple recessed mould cavities, wherein the first and second phase are alternately carried out.

3. The method according to claim 1, further comprising the steps of:

arranging a plurality of said one or more pressure housings in a circumferential array around the outer drum surface; and rotating the mould drum during cleaning and/or evaluation, such that distinct phases are consecutively performed.

4. The method according to claim 1, further comprising the steps of:

providing one of said one or more pressure housings with one or more nozzles;

connecting the one or more nozzles to a cleaning fluid source; and cleaning in a cleaning phase wherein cleaning fluid is sprayed into the multiple recessed mould cavities by means of the one or more nozzles.

5. The method according to claim 1, further comprising the steps of:

providing one of said one or more pressure housings with a bubble diffuser;

connecting the bubble diffuser to a cleaning gas source; and cleaning in the first phase by providing the pressurized fluid stream with bubbles by means of the bubble diffuser.

6. A system for carrying out the method of claim 1, comprising:

a food products mould drum having an outer drum surface provided with multiple recessed mould cavities, each recessed mold cavity with a mould cavity wall formed at least in part by a wall part with a porous structure, the mould drum further being provided with one or more passage ports, the one or more passage ports being in fluid communication with the multiple recessed mould cavities via one or more passages and via a plurality of said wall part with said porous structure, wherein the mould drum having become soiled in a process of moulding three-dimensional products from a mass of one or more food starting materials involving rotating the mould drum and feeding the mass to the multiple recessed mould cavities and ejecting formed food products from said mould drum; and a mould drum cleaning and/or evaluating device with a fluid circuit comprising a pump creating a pressurized fluid stream in a pressure line of the fluid circuit, the circuit further comprising a return line, wherein the mould drum cleaning and/or evaluating device further comprises:

one or more pressure housings adapted to be arranged against an outside of and over a selection of one or more of the multiple recessed mould cavities and adapted to form, together with the mould drum, an outside chamber, the outside chamber having a chamber port adapted to be in fluid communication with the selection of the one or more of the multiple recessed mould cavities; the chamber port being adapted to be connected to the pressure line of the fluid circuit, wherein at least one of the one or more passage ports is adapted to be connected to the return line of the fluid circuit, such that in a first phase the pressurized fluid stream is allowed to enter via the chamber port into the multiple recessed mould cavities and then via the plurality of said wall part with said porous structure through the one or more passages, and to exit via the at least one of the one or more passage ports to the return line of the fluid circuit.

7. The system according to claim 6, wherein the fluid circuit further comprises a valve assembly in connection with the pressure line and in connection with the return line, said valve assembly comprising a first valve port adapted to be in fluid connection with the chamber port and a second valve port in fluid connection with the at least one of the one or more passage ports.

8. The system according to claim 7, wherein the valve assembly is operable by a control device.

9. The system according to claim 6, wherein a pressure sensor is provided and configured to determine the pressure in the outside chamber, the pressure sensor being connectable to a control device.

10. The system according to claim 6, wherein a plurality of said one or more pressure housings are adapted to be arranged in a circumferential array around the outer drum surface, and wherein the mould drum is rotatable during cleaning and/or evaluation, allowing distinct phases to be consecutively performed.

11. The system according to claim 6, wherein one of said one or more pressure housings further comprises one or more nozzles connected to a cleaning fluid source, allowing a cleaning phase wherein cleaning fluid is sprayed into the multiple recessed mould cavities via said one or more nozzles.

12. The system according to claim 6, wherein one of said one or more pressure housings further comprises a bubble diffuser in the outside chamber, which bubble diffuser is connected to a cleaning gas source, such that in the first phase the pressurized fluid stream is provided with bubbles.

13. The system according to claim 6, wherein the chamber port is formed in said one or more pressure housings.

14. A method for cleaning a food products mould drum having an outer drum surface provided with multiple recessed mould cavities, each recessed mould cavity with a mould cavity wall formed at least in part by a wall part with a porous structure, the mould drum further being provided with one or more passage ports, the one or more passage ports being in fluid communication with the multiple recessed mould cavities via one or more passages and via a plurality of said wall part with said porous structure, wherein the mould drum having become soiled in a process of moulding three-dimensional products from a mass of one or more food starting materials, said process involving rotating the mould drum and feeding the mass to the multiple recessed mould cavities and ejecting formed food products from said mould drum, and wherein use is made of a mould drum cleaning and/or evaluating device having a fluid circuit comprising a pump configured to create a pressurized fluid stream in a pressure line of the fluid circuit, the fluid circuit further comprising a return line, the method comprising the steps of:

arranging one or more pressure housings against an outside of and over a selection of one or more of the multiple recessed mould cavities, so as to form together with the mould drum an outside chamber, the outside chamber having a discharge port and a chamber port, said discharge port and said chamber port being in fluid communication with the selection of the one or more of the multiple recessed mould cavities;

connecting the chamber port to the pressure line of the fluid circuit, and connecting the discharge port with the return line of the fluid circuit; and cleaning the selection of the one or more of the multiple recessed mould cavities in a first phase by causing a pressurized fluid stream to enter via the chamber port into the multiple recessed mould cavities and to exit via the discharge port to the return line of the fluid circuit.

15. A method for cleaning a food products mould drum having an outer drum surface provided with multiple recessed mould cavities, each recessed mould cavity with a mould cavity wall formed at least in part by a wall part with a porous structure, the mould drum further being provided with one or more passage ports, the one or more passage ports being in fluid communication with the multiple recessed mould cavities via one or more passages and via a plurality of said wall part with said porous structure, wherein the mould drum having become soiled in a process of moulding three-dimensional products from a mass of one or more food starting materials, said process involving rotating the mould drum and feeding the mass to the multiple recessed mould cavities and ejecting formed food products from said mould drum, the method comprising the steps of:

arranging one or more pressure housings against an outside of and over one or more of the multiple recessed mould cavities, so as to form together with the mould drum an outside chamber, the outside chamber having a radiation source; and cleaning one or more of said multiple recessed mould cavities in a first phase by causing radiation in said one or more pressure housings by means of said radiation source.

16. A system for carrying out the method of claim 14, comprising:

a food products mould drum having an outer drum surface provided with multiple recessed mould cavities, each recessed mould cavity with a mould cavity wall formed at least in part by a wall part with a porous structure, the mould drum further being provided with one or more passage ports, the one or more passage ports being in fluid communication with the multiple recessed mould cavities via one or more passages and via a plurality of said wall part with said porous structure, the mould drum having become soiled in a process of moulding three-dimensional products from a mass of one or more food starting materials involving rotating the mould drum and feeding the mass to the multiple recessed mould cavities and ejecting formed food products from said mould drum; and a mould drum cleaning and/or evaluating device with a fluid circuit comprising a pump creating a pressurized fluid stream in a pressure line of the fluid circuit, the circuit further comprising a return line, wherein the mould drum cleaning and/or evaluating device further comprises:

one or more pressure housings adapted to be arranged against the outside of and over a selection of one or more of the multiple recessed mould cavities and adapted to form, together with the mould drum, an outside chamber, the outside chamber having a discharge port adapted to be connected to the return line of the fluid circuit and a chamber port adapted to be in fluid communication with the selection of the one or more of the multiple recessed mould cavities, and wherein the chamber port is adapted to be connected to the pressure line of the fluid circuit, such that in a first phase the pressurized fluid stream is allowed to enter via the chamber port into the multiple recessed mould cavities and exit via the discharge port to the return line of the fluid circuit.

* * * * *